(12) United States Patent
Liu et al.

(10) Patent No.: US 8,641,315 B2
(45) Date of Patent: Feb. 4, 2014

(54) FURNITURE CONNECTING PIECE

(75) Inventors: Minsheng Liu, Dongguan (CN); Yuqi Liu, Dongguan (CN)

(73) Assignees: Lei Cao, Dongguan, Guangdong (CN); Jie Liu, Dongguan, Guangdong (CN); Minsheng Liu, Dongguan, Guangdong (CN)

( * ) Notice: Subject to any disclaimer, the term of this patent is extended or adjusted under 35 U.S.C. 154(b) by 0 days.

(21) Appl. No.: 13/515,901

(22) PCT Filed: Dec. 16, 2010

(86) PCT No.: PCT/CN2010/079845
§ 371 (c)(1),
(2), (4) Date: Jun. 14, 2012

(87) PCT Pub. No.: WO2011/072608
PCT Pub. Date: Jun. 23, 2011

(65) Prior Publication Data
US 2012/0301217 A1 Nov. 29, 2012

(30) Foreign Application Priority Data
Dec. 17, 2009 (CN) .......................... 2009 1 0265231

(51) Int. Cl.
*F16B 12/22* (2006.01)

(52) U.S. Cl.
USPC .................. 403/353; 403/297; 403/DIG. 10; 403/DIG. 13

(58) Field of Classification Search
USPC ....... 403/268, 298, 353, 381, 409.1, DIG. 10, 403/DIG. 13; 411/32, 33, 55; 312/265.5, 312/263, 111, 384.4
See application file for complete search history.

(56) References Cited

U.S. PATENT DOCUMENTS

| | | | | |
|---|---|---|---|---|
| 2,470,924 A * | 5/1949 | Flogaus | ...................... | 411/80.6 |
| 3,596,942 A * | 8/1971 | Zoebelein | ..................... | 403/230 |
| 4,060,949 A * | 12/1977 | Busse | ........................... | 403/231 |
| 5,002,346 A * | 3/1991 | Gasser | ....................... | 312/348.4 |
| 5,364,181 A * | 11/1994 | Scheible | .................... | 312/348.4 |
| 5,807,015 A * | 9/1998 | Goto | ............................... | 403/268 |
| 5,839,164 A * | 11/1998 | Cress et al. | .................... | 16/383 |
| 5,895,103 A * | 4/1999 | Huber | ........................ | 312/348.4 |
| 5,970,675 A * | 10/1999 | Schray | ......................... | 52/582.1 |
| 6,196,778 B1 * | 3/2001 | Wakai | ............................ | 411/42 |
| 6,200,062 B1 * | 3/2001 | You | .................................. | 403/381 |
| 6,234,596 B1 * | 5/2001 | Egger | ........................ | 312/348.4 |
| 8,104,989 B2 * | 1/2012 | Liu | ................................ | 403/298 |
| 2008/0213040 A1 * | 9/2008 | Morze-Reichartz | .......... | 403/381 |
| 2010/0329779 A1 * | 12/2010 | Chen | ......................... | 403/374.1 |

* cited by examiner

*Primary Examiner* — Joshua Kennedy
(74) *Attorney, Agent, or Firm* — Shimokaji & Associates, P.C.

(57) ABSTRACT

A kind of furniture connecting piece includes a base and a screw. The base has opposite upper surface and lower surface, opposite two side surfaces, and opposite front surface and back surface. The lower surface of the base is provided with a gapped groove extending to the upper surface of the base, and the gapped groove runs through the front surface and the back surface of the base. The upper surface of the base is provided with a screw hole communicating with the gapped groove. The screw passes through the screw hole and is partially contained within the gapped groove. The furniture connecting piece not only avoids suffering damage in the process of mounting the screw but also strengthens the installation intensity between the furniture connecting piece and the furniture component by setting the gapped groove in the screw hole.

17 Claims, 15 Drawing Sheets

FURNITURE CONNECTING PIECE

FIELD OF THE INVENTION

The present invention relates to a connecting piece, and more particularly to a furniture connecting piece which has a gapped groove at the position where a screw is contained in the furniture connecting piece.

BACKGROUND OF THE INVENTION

Now, furniture with large volume is usually designed for assembly. That is to say, furniture components are pre-processed according to the shape and dimension of the future, during the transportation the furniture components are first transported to the user, and then they are assembled into combination with the help of furniture connecting pieces. The methods not only resolve the inconvenient problems in the package and transportation, but also benefit for the user to disassemble and keep them when they are idled, this saves the store space.

Most of the present furniture fittings are designed as that a male connecting piece and a female connecting piece are engagable with each other, called furniture connecting piece. The male connecting piece has protruding posts, and the female connecting piece has recesses matching with the protruding posts and used for holding and locking the protruding posts. When the furniture components need to be connected, the male connecting piece and the female connecting piece are pre-embedded in the surfaces of them respectively, and then the protruding posts are embedded into the recesses, thereby achieving the seamless connection between the furniture components. Thus the user can disassemble and assemble the furniture components without using a tool.

However, in the using process, we found that the connection strength of the furniture components, on one side, was decided by the match strength of the male connecting piece and the female connecting piece, on the other side, was decided by the assembling strength of the furniture connecting pieces and the furniture components. However, in the present furniture connecting piece, the male connecting piece and the female connecting piece are usually embedded in the pre-set assembling recess in the surface of the furniture components. In processing, the assembling recess is difficultly to achieve the precise fit between the margin of the female connecting piece and the margin of male connecting piece. When the female connecting piece and the male connecting piece are embedded into the assembling recess, it usually needs auxiliary tools, for example screws or expansion nails etc., to increase the connection strength. However, when the screws are inserted into the furniture connecting pieces or the furniture components with force, or digging holes on them for assembling the expansion nails, the furniture connecting pieces or the furniture components will be extruded. If the material of the furniture connecting pieces or the furniture components is weak in tension, or the material of them is thin, the furniture connecting pieces or the furniture components will be easily breached and damaged.

SUMMARY OF THE INVENTION

To overcome the above-mentioned drawbacks, an object of the present invention is to provide a furniture connecting piece which is provided with a gapped groove at the position where the screw body is contained in the furniture connecting piece, which not only avoids the screw extruding the furniture connecting piece to damage the furniture connecting piece or the furniture component during the installation process but also increases the jointing strength between the furniture connecting piece and the furniture component.

The furniture connecting piece in accordance with one aspect of the present invention includes a base and a screw. The base has opposite upper surface and lower surface, opposite side surfaces, and opposite front surface and back surface. The lower surface of the base is provided with a gapped groove extending to the upper surface of the base, and the gapped groove runs through the front surface and the back surface of the base. The upper surface of the base is provided with a screw hole communicating with the gapped groove, and the screw passes through the screw hole and is partially contained within the gapped groove.

The gapped groove is located adjacent to the side surface of the base, an inner wall of the gapped groove, which is far from the side surface of the base, is perpendicular to the lower surface of the base; another inner wall of the gapped groove, which is near to the side surface of the base, has a lower portion inclining to the center of the gapped groove.

The intersections of the inner walls of the gapped groove and the lower surface are arc-shaped.

The front surface, the lower surface and the two side surfaces of the base are all provided with chamfered teeth.

A plurality of blind holes are defined in the lower surface of the base.

One or a few protruding posts are formed on the upper surface of the base.

The screw has a screw cap, a screw body and a screw tongue at opposite sides of the screw cap, the screw body passes through the screw hole and is contained within the gapped groove, the screw cap holds in the screw hole, and the screw tongue inserts into another suitable article.

The upper surface of the base defines one or some recesses extending to the lower surface of the base.

The recess runs through the lower surface of the base to form an opening in the lower surface, the lower surface of the base sets a cover to seal the opening.

The screw hole is trumpet-shaped.

The front surface and the back surface define one or several glue tanks which run into the upper surface and the lower surface of the base.

The opposite side surfaces of the base respectively define a notch near to the upper surface.

The furniture connecting piece in accordance with another aspect of the present invention includes a male connecting piece and a female connecting piece. The male connecting piece includes a male base and screws. The male base has opposite upper surface and lower surface, opposite side surfaces, and opposite front surface and back surface. The male connecting piece has one or several protruding posts on the upper surface of the male base. the female connecting piece has one or several recesses engaging with the protruding posts. The lower surface of the male base is provided with a gapped groove extending to the upper surface of the male base, and the gapped groove runs through the front surface and the back surface of the male base. The upper surface of the male base is provided with a screw hole communicating with the gapped groove, and the screw passes through the screw hole and is partially contained within the gapped groove.

Preferably, the female connecting piece includes a female base and a screw. The female base has opposite upper surface and lower surface, opposite side surfaces, and opposite front surface and back surface. The recess is defined in the upper surface of the female base and extends to the lower surface of the female base. The lower surface of the female base is provide with a gapped groove extending to the upper surface of the female base, and the gapped groove runs through the front surface and the back surface of the female base. The upper surface of the female base is provided with a screw hole communicating with the gapped groove, and the screw passes through the screw hole and is partially contained within the gapped groove of the female base.

The furniture connecting pieces in accordance with another aspect of the present invention includes a male connecting piece and a female connecting piece. The female connecting piece includes a female base and a screw. The female base has opposite upper surface and lower surface, opposite side surfaces, and opposite front surface and back surface. The upper surface of the female base is provided with one or several recesses extending to the lower surface of the female base. The male connecting piece has one or several protruding posts engaging with the recesses. The lower surface of the female base is provided with a gapped groove extending to the upper surface of the female base, and the gapped groove runs through the front surface and the back surface of the female base. The upper surface of the female base is provided with a screw hole communicating with the gapped groove, and the screw passes through the screw hole and is partly contained within the gapped groove.

Preferably, the male connecting piece includes a male base and a screw. The male base has opposite upper surface and lower surface, opposite side surfaces, and opposite front surface and back surface. The protruding post of the male connecting piece is formed on the upper surface of the male base. The lower surface of the male base is provided with a gapped groove extending to the upper surface of the male base, and the gapped groove runs through the front surface and the back surface of the male base. The upper surface of the male base is provided with a screw hole communicating with the gapped groove, and the screw passes through the screw hole and is partially contained within the gapped groove of the male base.

Preferably, the male connecting piece includes a male base and a screw. The male base has opposite upper surface and lower surface, opposite side surfaces, and opposite front surface and back surface. The lower surface of the male base is provided with a gapped groove extending to the upper surface of the male base, and the gapped groove runs through the front surface and the back surface of the male. The upper surface of the male base is provided with a screw hole communicating with the gapped groove. The screw has a screw cap, a screw body and a screw tongue at opposite sides of the screw cap. The screw body passes through the screw hole and partly holds in the gapped groove, and the screw tongue engages with the recess.

The male connecting piece only includes a cylindrical male base and the protruding post provided on an upper surface of the cylindrical male base.

The advantageous effects of the invention is as follows: The furniture connecting piece not only avoids suffering damage in the process of mounting the screw but also strengthens the installation intensity between the furniture connecting piece and the furniture component by setting the gapped groove in the screw hole of the furniture connecting piece.

DETAILED DESCRIPTION OF ILLUSTRATED EMBODIMENTS

In order to concretely illustrate the technical solutions and structure features of the furniture connecting piece of the present invention, the follow will further illustrate with specific embodiments and the drawings.

Figure 1:
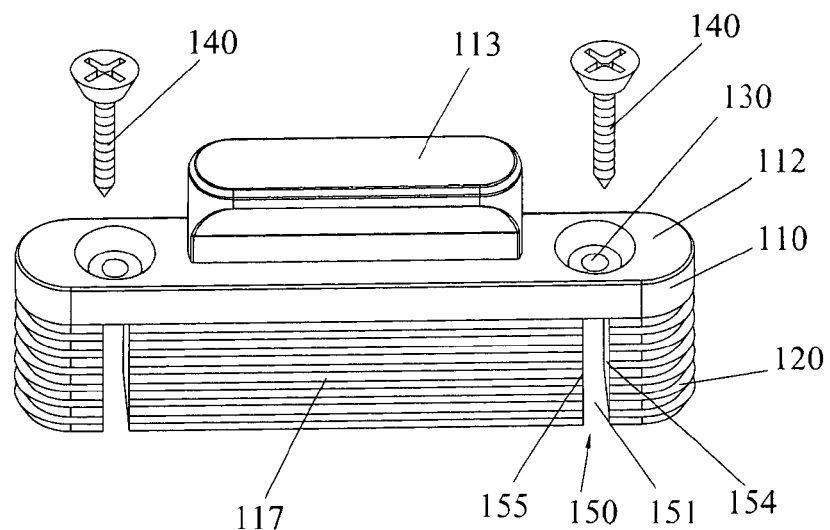
FIG. 1 is a perspective view of the furniture connecting piece in accordance with a first embodiment of the invention.
Figure 8:
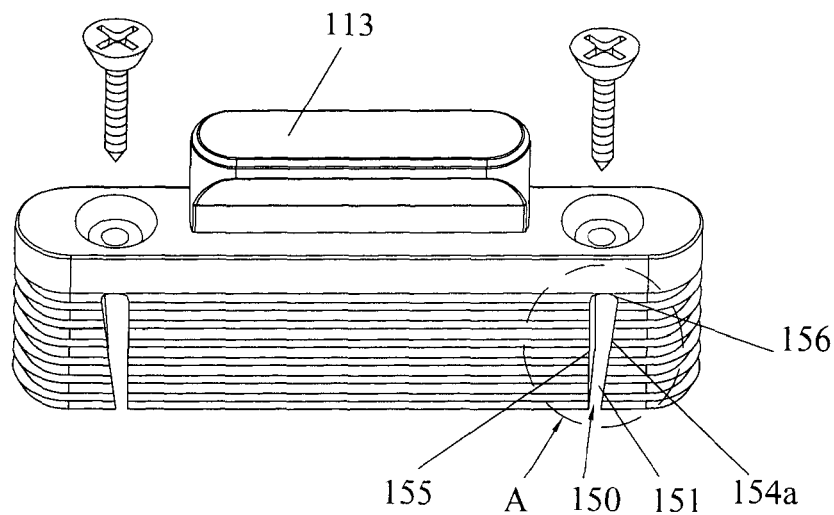
FIG. 8 is a perspective view of the furniture connecting piece in accordance with a second embodiment of the invention.
Figure 10:
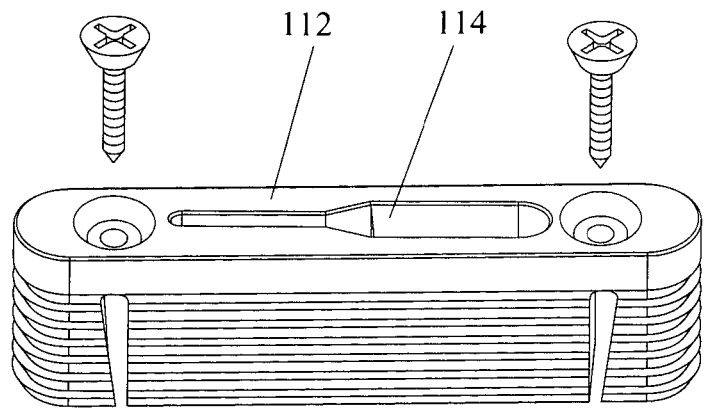
FIG. 10 is a perspective view of the furniture connecting piece in accordance with a third embodiment of the invention.

First, referring to FIG. 1, FIG. 8 and FIG. 10, FIG. 1 is a view of the first embodiment of the furniture connecting piece of the invention, FIG. 8 is a view of the second embodiment of the furniture connecting piece of the invention, and FIG. 10 is a view of the third embodiment of the furniture connecting piece of the invention.

The furniture connecting piece includes a base 110 and screws 140. The base 110 has opposite upper surface 112 and lower surface 111, opposite left and right surface 120, and opposite front surface 117 and back surface 118(not show). The lower surface 111 of the base has gapped grooves 150 extending to the upper surface 112 of the base. The gapped groove 150 runs through the front surface 117 and the back surface 118 of the base 110. The upper surface 112 of the base is provided with screw holes 130 communicating with the gapped grooves 150, the screw 140 passes through the screw hole 130 and is partially contained within the gapped groove 150.

Figure 3:
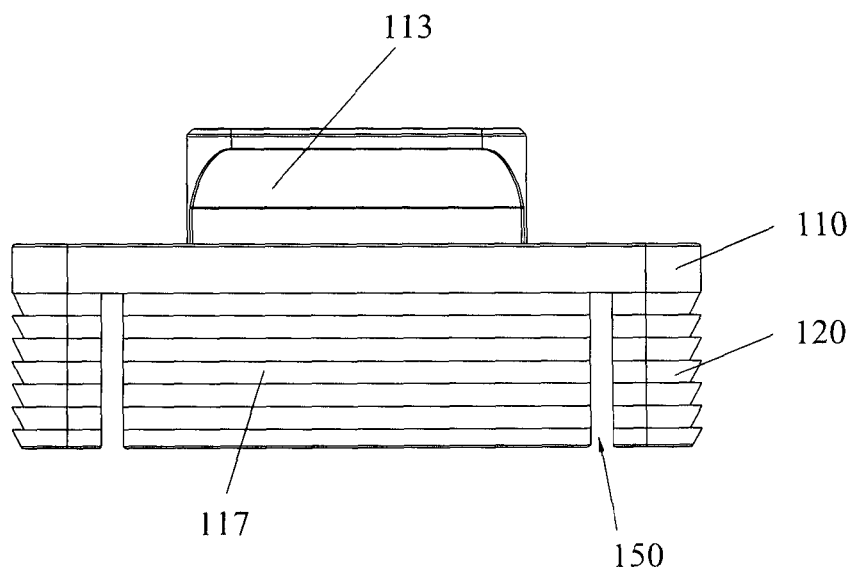
FIG. 3 is an upper view of a base of the furniture connecting piece of the first embodiment of the invention.
Figure 4:
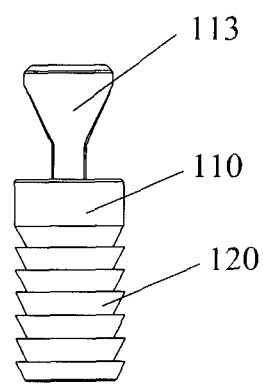
FIG. 4 is a lower view of the base of the furniture connecting piece of the first embodiment of the invention.

Referring to FIG. 3 and FIG. 4, the two side surfaces 120, the front surface 117 and the lower surface 118 of the base 110 are all provided with chamfered teeth. When the furniture connecting piece is installed into the predestined recess-cut in the furniture component, the chamfered teeth increase the biting strength between the furniture connecting piece and the furniture component, which further increase the connection strength between the furniture component and the furniture connecting piece.

Figure 5:
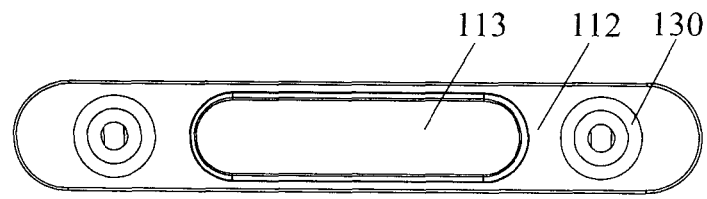
FIG. 5 is a front view of the base of the furniture connecting piece of the first embodiment of the invention.

Referring to FIG. 1 and FIG. 5, the upper surface 112 of the base 110 is provided with one or several protruding posts 113. The protruding post 113 can be inserted into a mating recess in another furniture connecting piece, thereby matching the two furniture connecting pieces.

Figure 2:
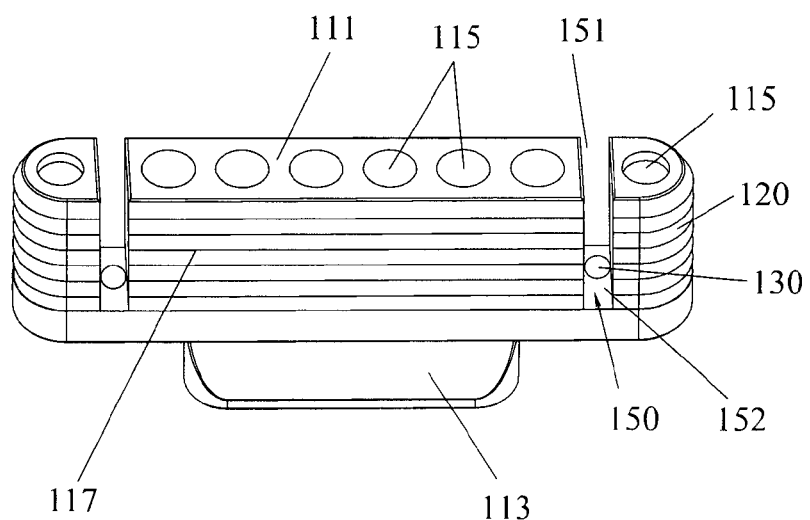
FIG. 2 is another perspective view of the furniture connecting piece shown in FIG. 1.
Figure 6:
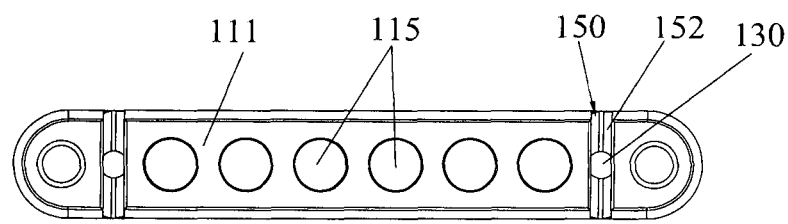
FIG. 6 is a side view of the base of the furniture connecting piece of the first embodiment of the invention.

Referring to FIG. 2 and FIG. 6, A plurality of blind holes 115 are defined in the lower surface 111 of the base 110. If the connecting piece is made of plastic materials, the plastic piece will shrank during the injection molding process, thereby leading the connecting piece to deform. However the blind holes can decrease shrink ratio of the connecting piece and maintain the shape of the connecting piece. And, before the connecting piece of the invention is installed into the recess cut preset on the surface of the furniture parts, first it is to coat the base 110 periphery with glue, then install the connecting piece into the recess cut. It is to depend on the frictional force between the base 110 periphery and the wall of the recess cut and the adhesive force of the glue to fix joint the base 110 and the furniture part. Because there are a few blind holes 151 on the lower surface 111 of the base 110, a part of the glue flows into the blind hole 151 and is kept in the connecting pieces. When the connecting piece is installed into the recess cut in the furniture, the glue will not flow out of the connecting piece for the extrusion between the side surface of the connecting piece and the wall of the recess cut, which promises the film thickness formed by the glue and the adhesive force of the glue and then promises the adhesive strength between the connecting piece and the furniture part. In the present invention, the connecting pieces and the furniture part tightly joint with high joint strength that is beneficial for the lifetime of the modular furniture.

Figure 7:
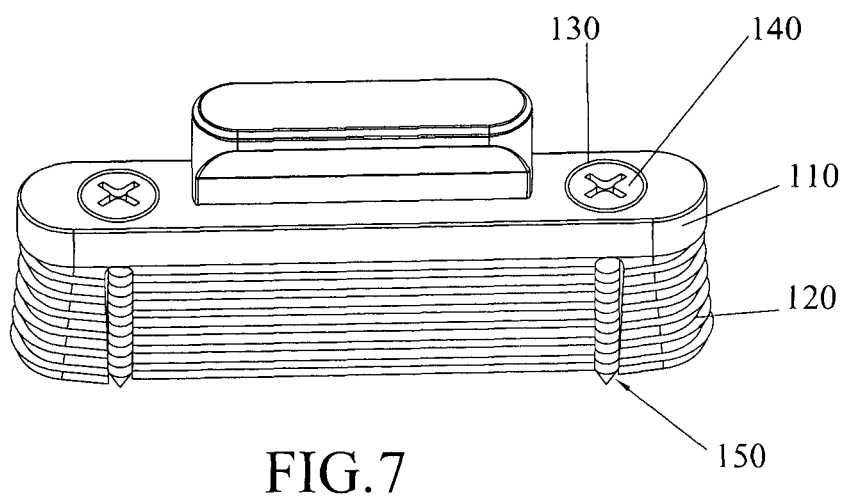
FIG. 7 is an assembly view of the furniture connecting piece of FIG. 1. The view shows that the screw 140 is installed into the furniture connecting piece of the FIG. 1 and extrudes the recess 150 thus pushes the side surface 120 of the base to expand outwards.

Referring to FIG. 7, the installation method of traditional screw or expansion nail is inserted into an enclosed hole. Centering on the hole, the screw or the nail will extrude the wall of the hole with the same force at every direction. That is to say, centering on the screw hole, the plate suffers uniform pressure at each direction, and because of suffering the extrusion, the plate will expand in all direction. If the quality material of the plate is thin or the expansion properties of the plate are worse, the plate is easy to burst or damage. In the invention, the screw 140 inserts into the screw hole 130, the screw 140 is partially contained in the gapped groove 150. Centering on the screw hole 130, in the plate where the screw hole 130 is in, only the two side walls of the gapped groove 150 are under pressure. That is to say, the two side plate of the gapped groove 150 respectively suffer pressure in opposite direction, because one end of the two side plate of the gapped groove 150 is joint, the other end is not joint, it leads that the two side plate of the gapped groove 150 expand in figure eight, thereby avoiding the plate to burst or damage.

Preferably, referring to FIG. 1 and FIG. 5, the screw hole 130 is trumpet-shaped. When the screw 140 inserts into the screw hole 130, the screw cap 141 holds in the screw hole 130 and the screw body 142 holds in the gapped groove 150, the two furniture parts jointed by the connecting piece will connect tightly.

Figure 9:
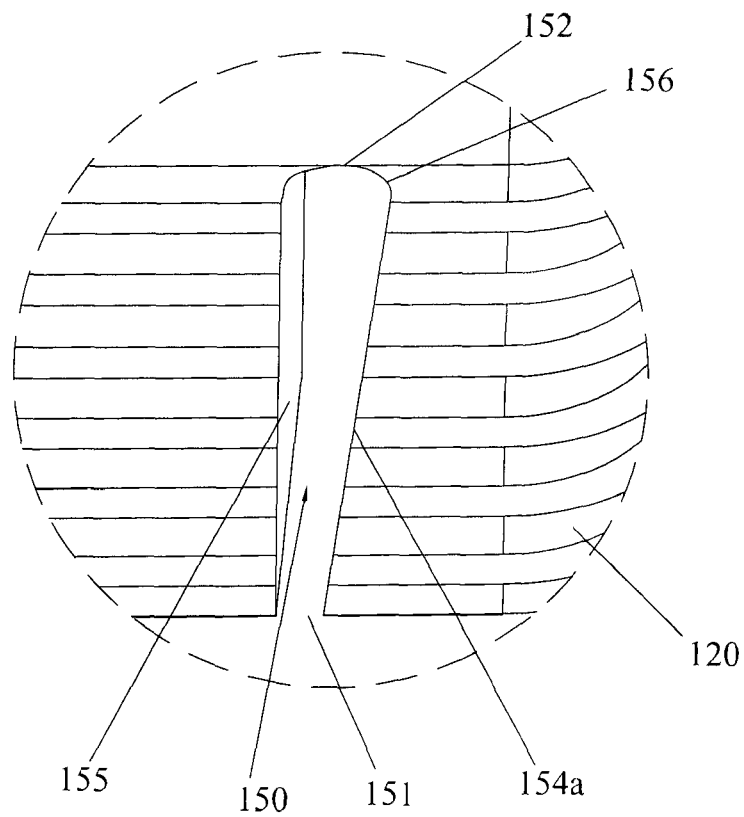
FIG. 9 is an enlarged view of the encircled portion labeled A of FIG. 3.

Preferably, referring to FIG. 8 and FIG. 9, the gapped groove 150 is located adjacent to the side surface 120 of the base 110. The wall 155 of the gapped groove 150, which is far from the side surface 120 of the base 110, is perpendicular to the lower surface 111 of the base 110; the wall 154a of the gapped groove 150, which is near to the side surface 120 of the base 110, has a lower portion inclining to the center of the gapped groove 150. The gapped groove 150 is defined adjacent to the side surface 120 of the base 110, thus the side surface 120 is easy to expand for the extrusion from the screw 140. When the furniture connecting piece installs into the reset recess cut in the furniture component, because of the expansion of the side wall 120, the connecting piece more tightly bites the reset recess cut in the furniture part, which increase the joint strength between the furniture connecting piece and the furniture component. Preferably, referring FIG. 8 and FIG. 9, The intersections 156 of the wall 154a and 155 with the gapped groove lower 152 is arc-shaped, which increases the tension within the plate, makes the plate not easily to burst.

Figure 11:
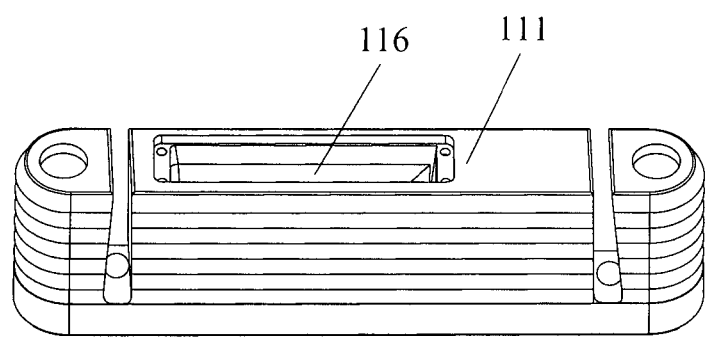
FIG. 11 is another perspective view of the furniture connecting piece shown in FIG. 10.
Figure 12:
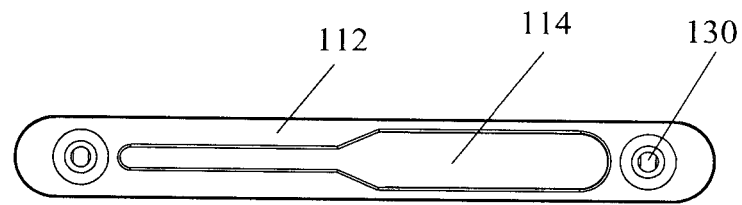
FIG. 12 is an upper view of FIG. 10.

Referring to FIG. 10, FIG. 11 and FIG. 12, the upper surface 121 of the base 110 defines one or some recesses 114 extending to the lower surface of the base. The recess 114 can hold a matching protruding post on another furniture part, thereby matching the two connecting pieces.

Figure 13:
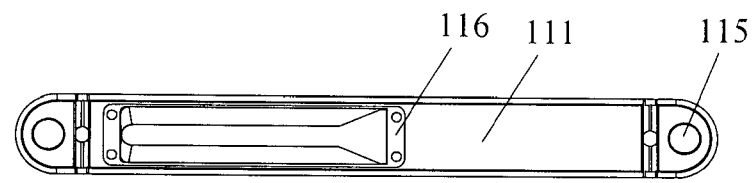
FIG. 13 is a lower view of FIG. 10.
Figure 14:
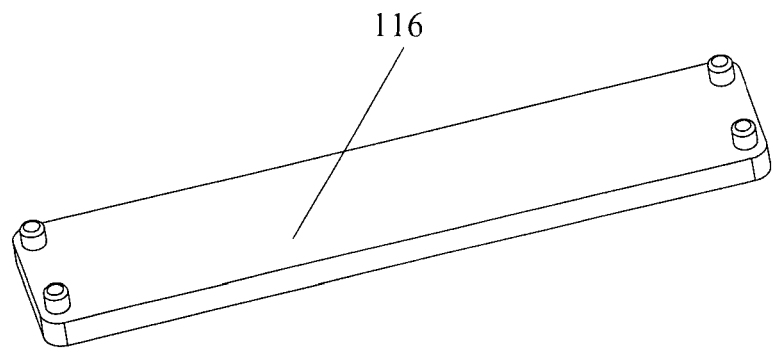
FIG. 14 is a view of the cover 116 of FIG. 11.

Referring to FIG. 11, FIG. 13 and FIG. 14, when the recess 114 runs into the lower surface 112 to form an opening in the lower surface 112, the lower surface 112 sets a cover 116 to seal the opening. In the invention, before the connecting piece installs into the preset recess cut in the furniture part, first it is to coat the base 110 periphery with glue, then install the connecting piece into the recess cut. It depends on frictional force between the base 110 periphery and the wall of the recess cut and the adhesive force of the glue to fix the base 110 and the furniture part. However, limited be the producing process, the recess 114 embodies an opening at the lower surface 111 of the base. During the installation, some glue will flows into the recess 114 from the opening and occupy some place. When another protruding post matching with the recess 114 inserts into the recess, there is not enough place for the protruding post tightly joining with the recess 114. So, a cover 116 is set at the lower surface 111 of the base 1110, which seals the opening of the recess on the lower surface 111, thus preventing the glue flowing into the recess 114, and promising enough place in the recess, then another protruding post matching with the recess 114 can insert into the recess 114 and achieve tightly match to each other.

Figure 15:
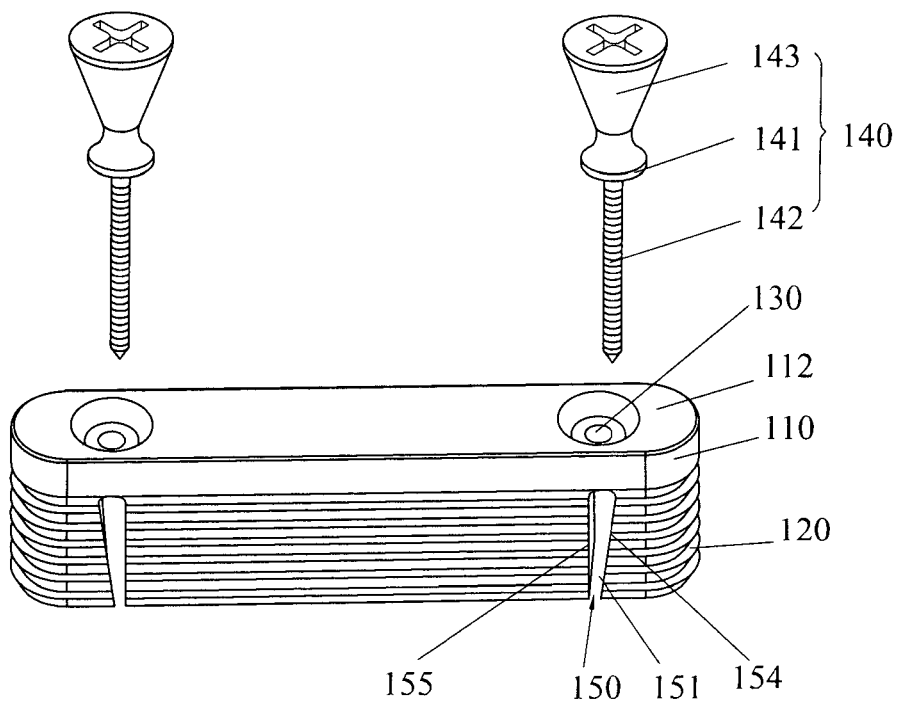
FIG. 15 is a perspective view of the furniture connecting piece in accordance with a fourth embodiment of the invention.

Referring to FIG. 15, FIG. 15 is a view of the fourth embodiment of the furniture connecting piece in the invention. The screw 140 includes a screw cap 141, a screw body 142 at one side of the screw cap and a screw tongue 143 at the contrary side. In the figure, on the base 110 of the connecting piece there is not protruding post. When the screw 140 is used in conjunction with the connecting piece, the screw body 142 runs into the screw hole 130 and holds in the gapped groove 150, the screw cap 141 holds in the screw hole 130, the screw tongue 143 inserts into another suitable article. FIG. 15 shows that the screw tongue 143 is conical shape, in actual using the screw tongue only need to insert another suitable article that matches with it, its shape is not limited.

Figure 16:
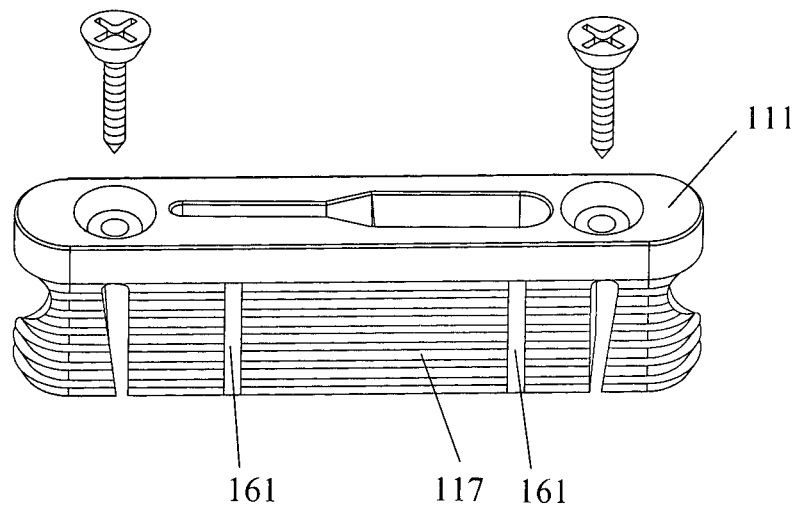
FIG. 16 is a perspective view of the furniture connecting piece in accordance with a fifth embodiment of the invention.

Referring to FIG. 16, FIG. 16 is a view of the fifth embodiment of the furniture connecting piece in the invention. There is one or a few glue tanks 116 which run into the front surface 111 and the lower surface 112 on the front surface 117 and the back surface 118 of the base. Before the connecting piece is installed into the recess cut, a layer of glue is first coated in the recess cut or on the periphery of the connecting piece. After the connecting piece is installed into the recess cut, a part of the glue will flow into the glue tank 116 and stays there, which will increase the tightness of jointing between the recess and the connecting piece.

Figure 17:
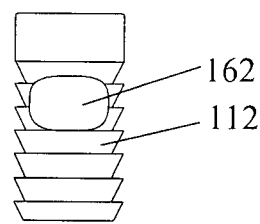
FIG. 17 is a side view of FIG. 16.

Referring to FIG. 16 and FIG. 17, a notch 162 is provided on somewhere close to the upper surface 111 at the relatively two surfaces 112 of the base. After the connecting piece installs into the mounting groove, the screw 140 passes through the screw hole 130 and capacities in the gapped groove 150, then it presses the side surface 112 to expand outside, therefore, the side surface 112 bite with the mounting groove, now, this may be drive somewhere close to the side wall at the upper surface 111 to incline. The notch 162 relieves the effect of the expansion of the side surface 112 on the upper side 111.

Figure 18:
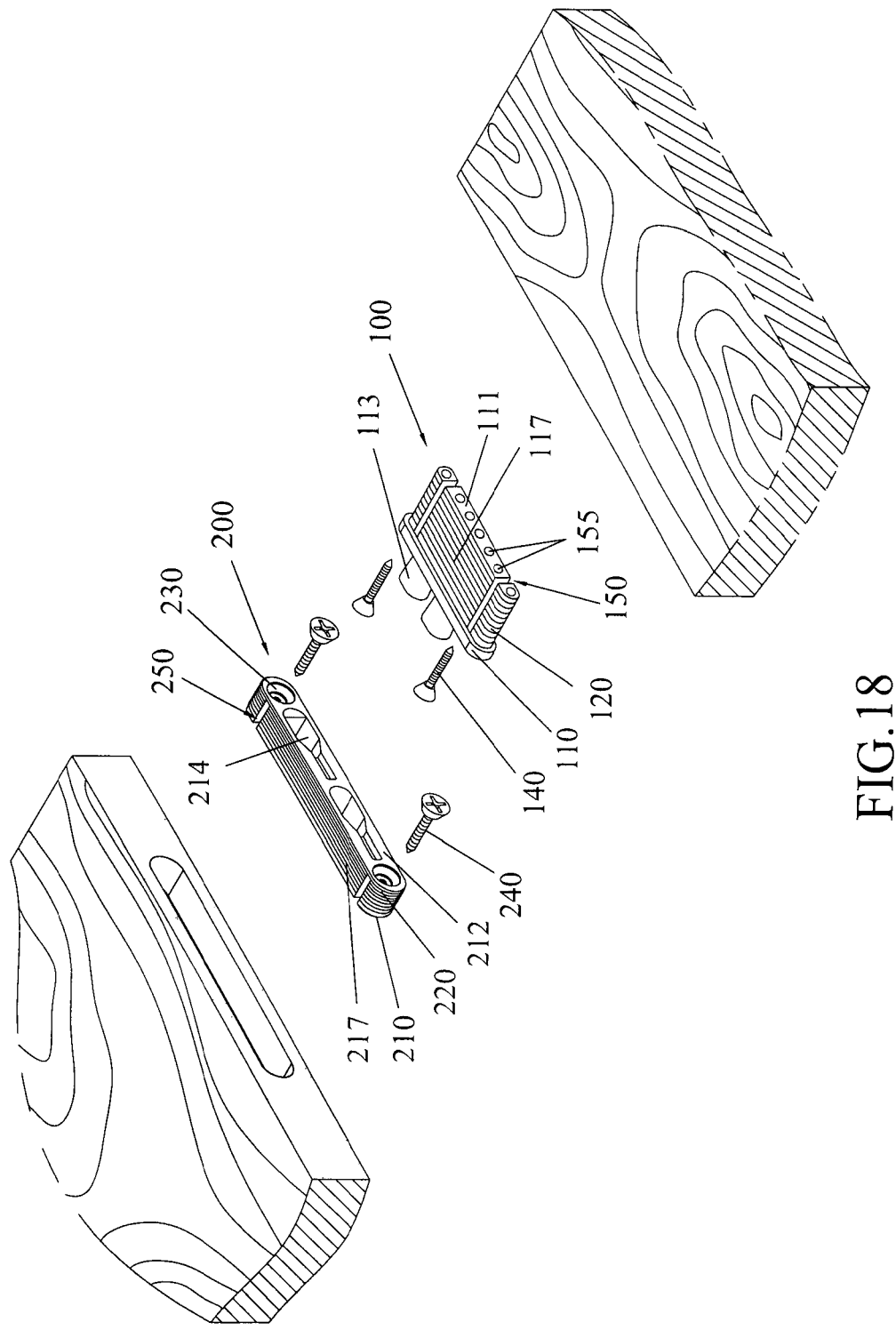
FIG. 18 is a perspective view of the furniture connecting piece in accordance with a sixth embodiment of the invention.
Figure 19:
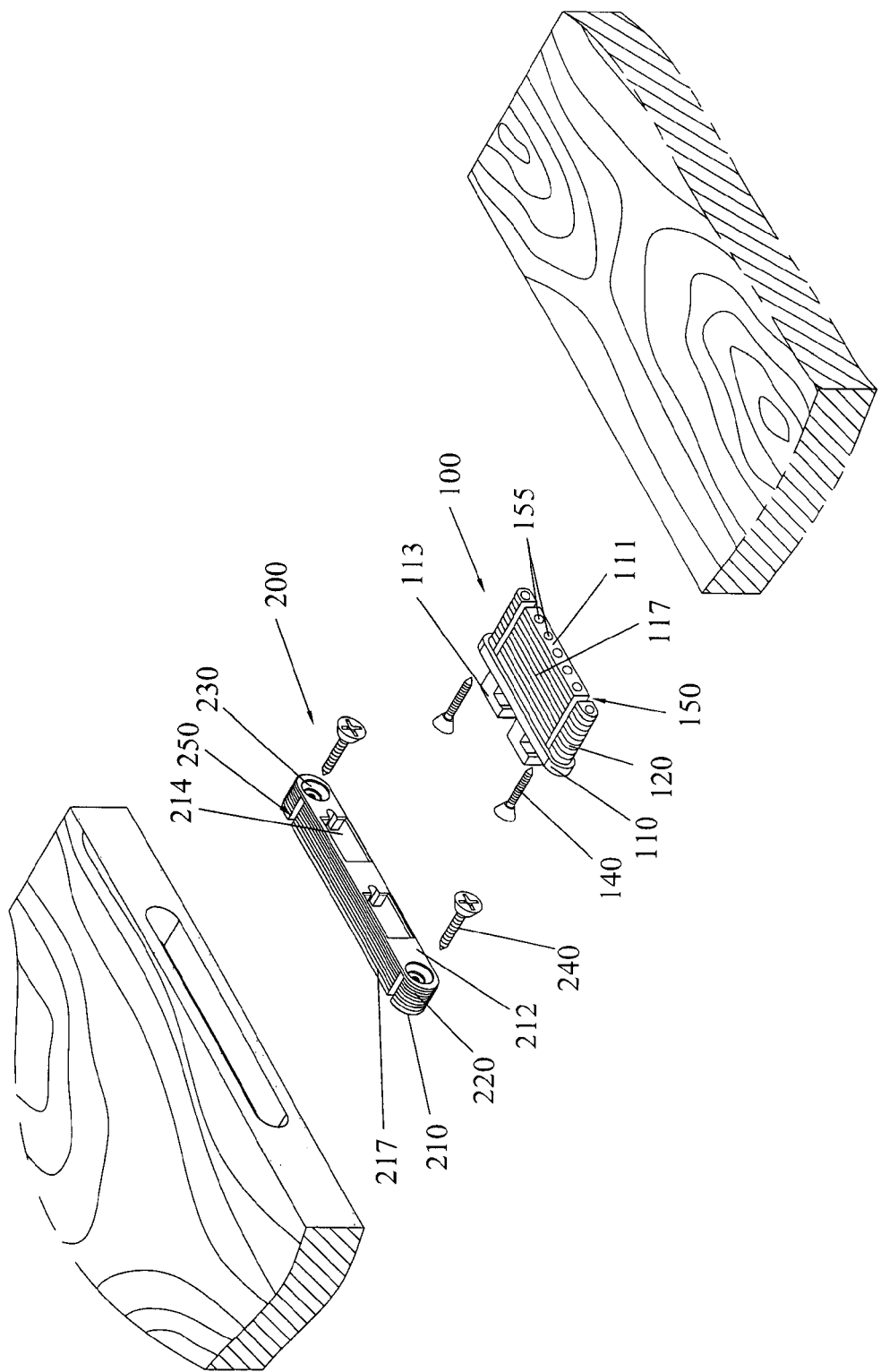
FIG. 19 is a perspective view of the furniture connecting piece in accordance with a seventh embodiment of the invention.

Referring to FIG. 18 and FIG. 19, FIG. 18 and FIG. 19 respectively is a view of the fifth, the sixth embodiment of the furniture connecting piece in the invention. A furniture connecting piece comprises of male connecting piece 100 and female connecting piece 200, the male connecting piece 100 includes a male base 110 and screw 140, the male base 110 has relative a upper surface 112 and a lower surface 111, relative a left and right surface 120, and relative a front surface 117 and a back surface 118. The male connecting piece 100 has one or a few protruding posts 113 on the upper surface of the base 110. The female connecting piece 200 has recess 214 that can interlock joint with the protruding post 113. The lower surface 111 of the male base 110 comprises some gapped grooves 150 which extend toward the upper surface 112 of the male base 110, and the gapped groove 150 runs through the front surface 117 and the back surface 118. On the upper surface 112 of the male base at the relatively position of the gapped groove there is screw hole 130 which runs into the gapped groove 150, the screw 140 passes through the screw hole 130 and partly capacities in the gapped groove.

Preferably, the female connecting piece 200 includes a female base 210 and screws 240, the female base 210 has relative a upper surface 212 and a lower surface 211, relative a left and right surface 220, and relative a front surface 217 and a back surface 218. The recess 214 situates on the upper surface 212 of the female base 210 and extends to the lower surface 211 of the female base. The lower surface 211 of the female base comprises some gapped grooves 250 which extend on at the upper surface 212 of the female base, and the gapped grooves 250 run through the front surface 217 and the back surface 218 of the female base. On the upper surface 211 of the female base at the relatively position of the gapped groove there is a screw hole 230 which runs into the gapped groove 250, the screw 240 passes through the screw hole 230 and is partially contained in the gapped groove 250.

Figure 20:
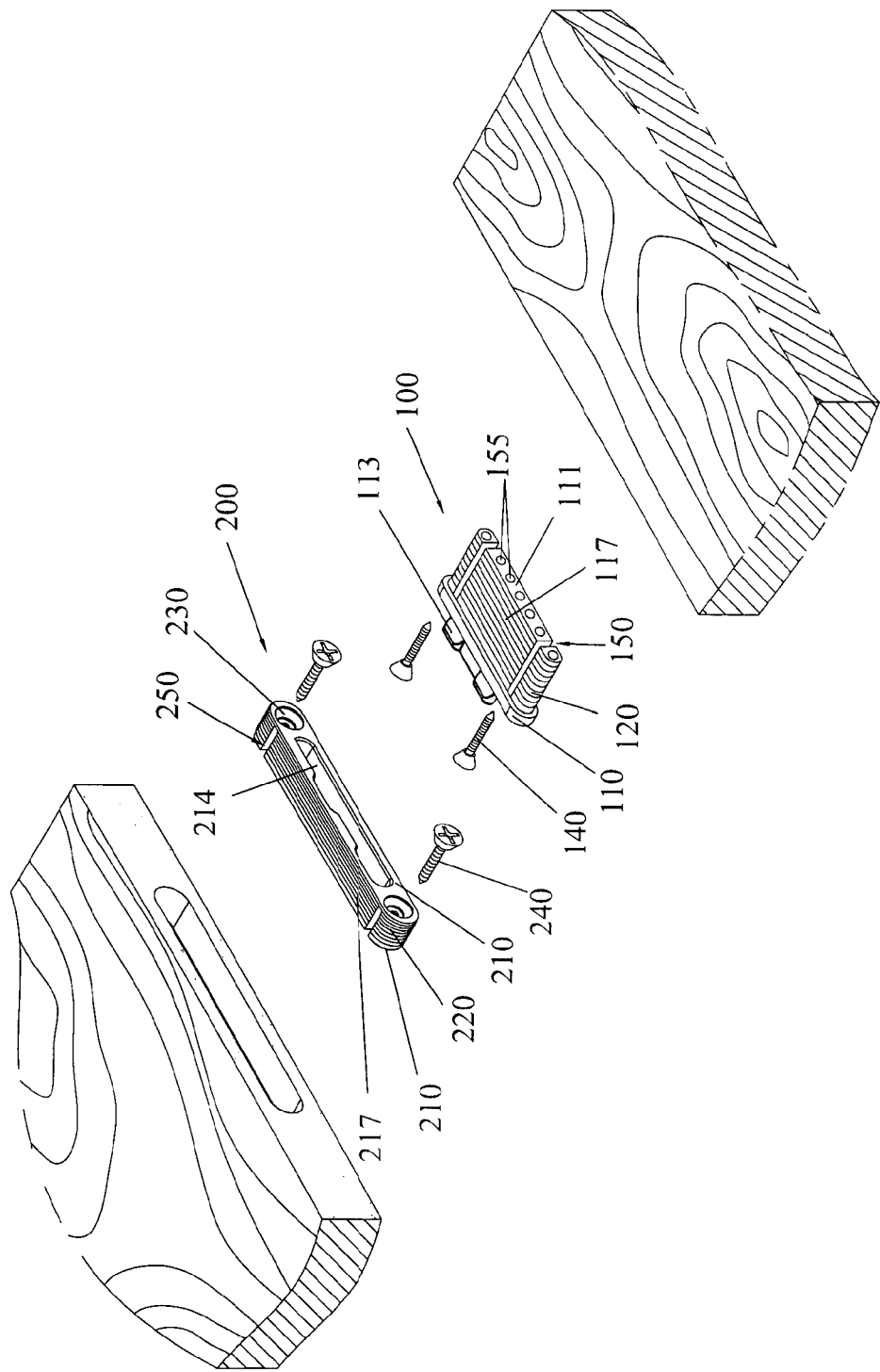
FIG. 20 is a perspective view of the furniture connecting piece in accordance with an eighth embodiment of the invention.
Figure 21:
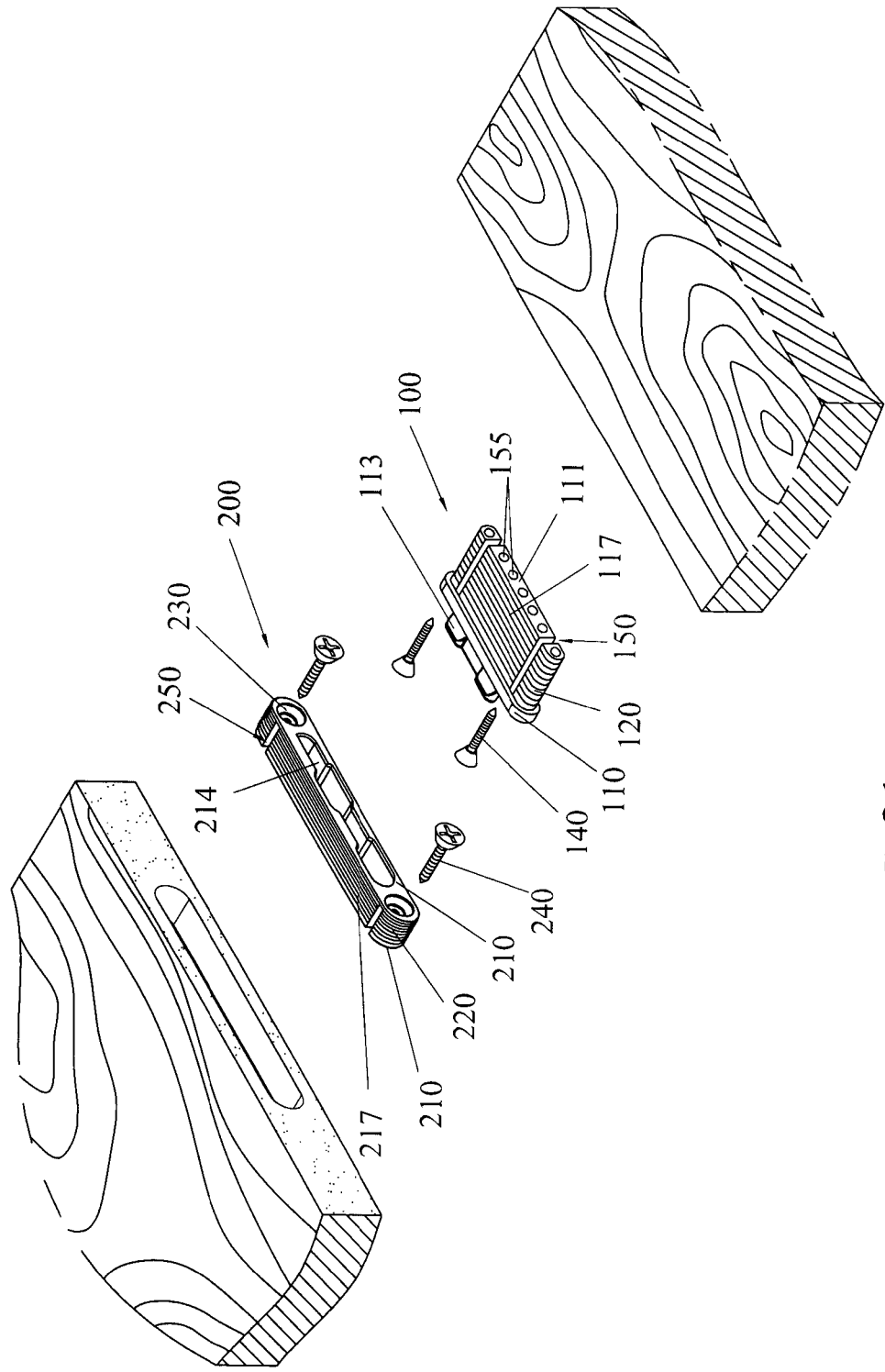
FIG. 21 is a perspective view of the furniture connecting piece in accordance with a ninth embodiment of the invention.

Referring to FIG. 20 and FIG. 21, FIG. 20 and FIG. 21 are views of the eighth, the ninth embodiments of the furniture connecting piece of the invention. The furniture connecting piece comprises a male connecting piece 100 and a female connecting piece 200. The female connecting piece 200 includes a female base 210 and screws 240. The female base 210 has opposite upper surface 212 and lower surface 211, opposite left and right surfaces 220, and opposite front surface 217 and back surface 218. On the upper surface 212 of the female base 210, the female connecting piece has one or a few recesses 214 extending to the lower surface 211 of the female base. The male connecting piece 100 has a protruding post 113 which engages with the recess 214. The lower surface 211 of the female base comprises some gapped grooves 250 which extend to the upper surface 212 of the female base and run through the front surface 217 and the back surface 218. On the upper surface 212 of the female base at the relatively position of the gapped groove 250 there is a screw hole 230 which runs into the gapped groove 250. The screw 240 passes through the screw hole 230 and is partially contained in the gapped groove 250.

Preferably, the male connecting piece 100 includes a male base 110 and screws 140, the male base 110 has relative a upper surface 112 and a lower surface 111, relative a left and right surface 120, and relative a front surface 117 and a back surface 118. The protruding post 113 of the male connecting piece projects the upper surface 111 of the male base 110. The lower surface 111 of the male base 110 comprises some gapped grooves 150 which extend toward the upper surface 111 of the male base 110 and run through the front surface 117 and the back surface 118 of the male base 110. On the upper surface 111 of the male base 110 at the relatively position of the gapped groove 150 there is a screw hole 130 which runs into the gapped groove 150, and the screw 140 passes through the screw hole 130 and is partly contained in the gapped groove 150.

Figure 22:
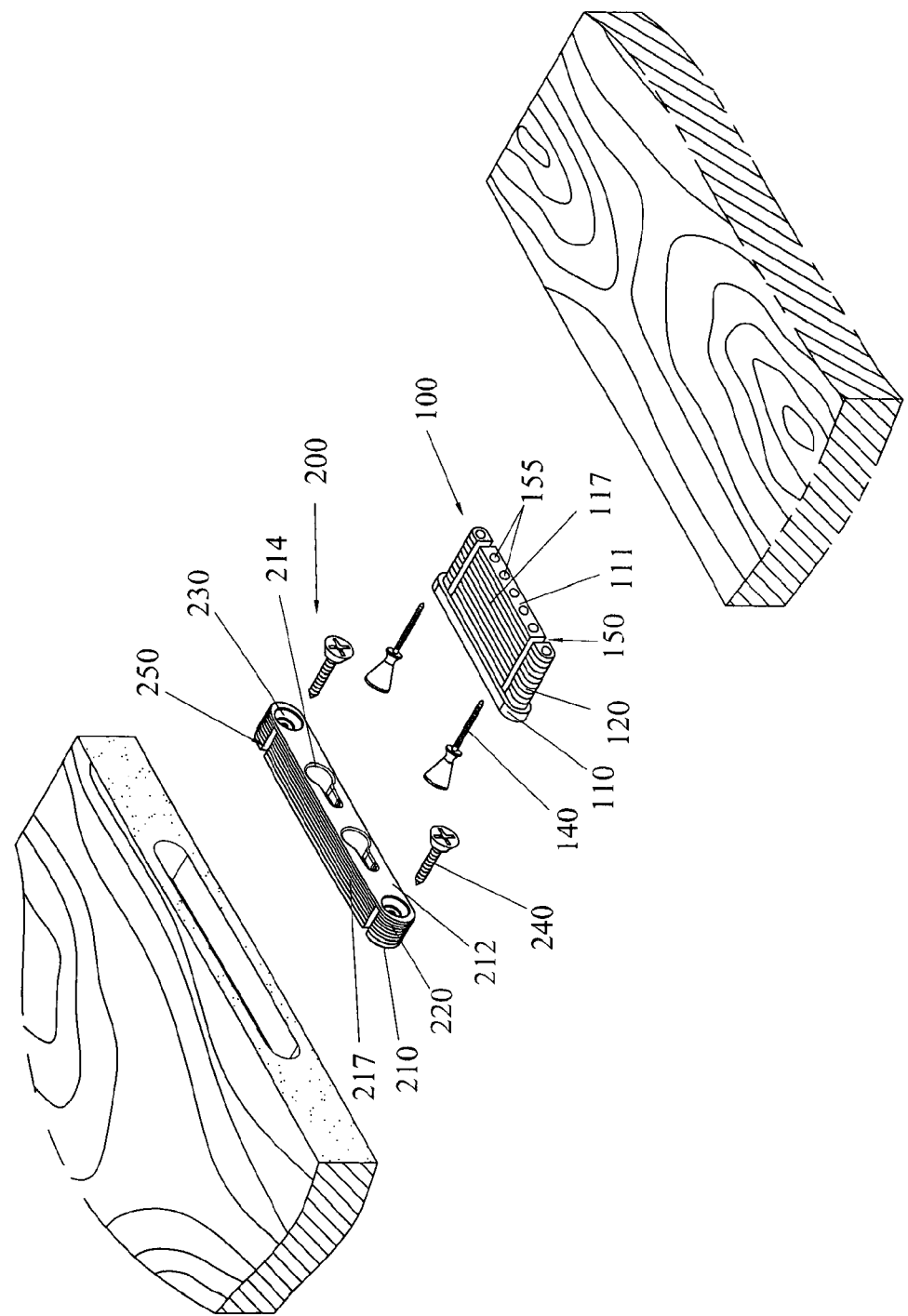
FIG. 22 is a perspective view of the furniture connecting piece in accordance with a tenth embodiment of the invention.

Preferably, Referring FIG. 22, FIG. 22 is a view of the tenth embodiment of the furniture connecting piece in the invention. The male connecting piece 100 includes a male base 110 and screws 140, the male base 110 has relative a upper surface 1112 and a lower surface 111, relative a left and right surface 120, and relative a front surface 117 and a back surface 118. The lower surface 111 of the male base 110 comprises some gapped grooves 150 which extend toward the upper surface 112 of the male base 110 and run through the front surface 117 and the back surface 118 of the male base. On the upper surface 111 of the male base 110 at the relatively position of the gapped groove 150 there is screw hole 130 which runs into the gapped groove 150. The screw 140 includes screw cap 141, at the two surfaces of which respectively has screw body 142 and screw tongue 143. The screw body 142 passes through the screw hole 130 and partly capacities in the gapped groove 150, the screw tongue 143 can interlock joint with the recess 214.

Figure 23:
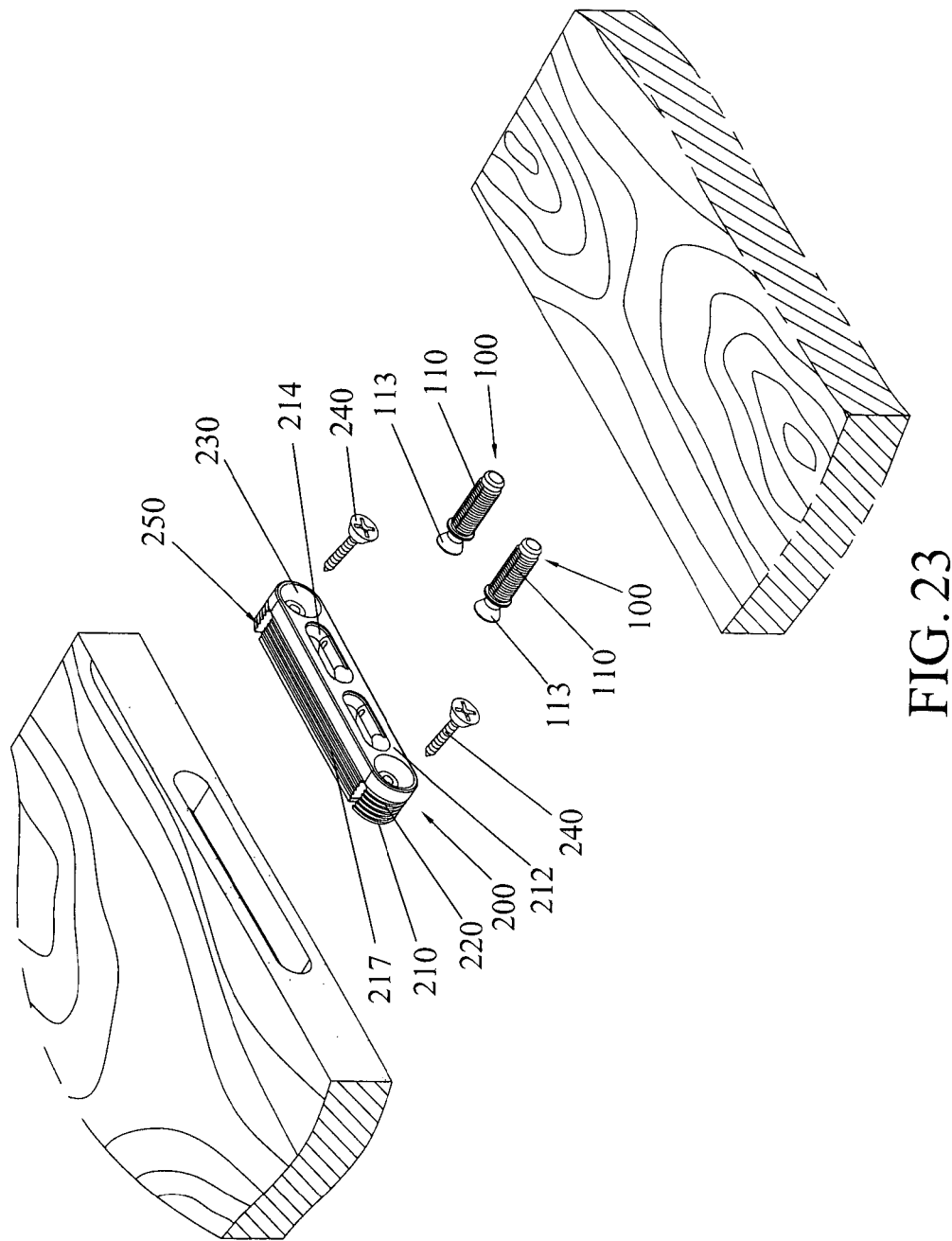
FIG. 23 is a perspective view of the furniture connecting piece in accordance with an eleventh embodiment of the invention.

FIG. 23, FIG. 23 are views of the eleventh embodiment of the furniture connecting piece in the invention. In the figures, the male connecting piece 100 only contains a cylindrical male base 110 and the protruding post 113 mounted on the upper surface of the male base 110. The cylindrical male base 110 has screw function, it can insert into the furniture plate thus the male connecting piece is fixed on the furniture plate.

In the connecting piece of the invention, the recess 214 includes a leading recess connecting with a capacity recess. When the male connecting piece is used in conjunction with the female connecting piece, the protruding post 113 inserts into the leading recess of the recess 214, then slides in the recess 214 and enters the capacity recess and is matched with the recess 214 tightly, thus the male connecting piece and the female connecting piece are engaged with each other. In the present invention, when the male connecting piece is matchrf with the female connecting piece, the number of the protruding post 113 is equal to the number of the recess 214, and the shape of both can fit each other. FIG. 18, FIG. 19, FIG. 20, FIG. 21 and FIG. 22 respectively show a few different shapes of the protruding post 113 of the male connecting piece and the recess 214 of the female connecting piece that can be complement each other. And, in FIG. 18, the protruding post 113 a cylinder with elliptical cross section, the recess 214 comprises of a leading recess with elliptical cavity and the capacity recess which can be tightly complement with the protruding post 113; In FIG. 17, the protruding post 113 is L-shape, the recess 214 comprises of a leading recess with L-shaped cavity and the capacity recess which can be tightly complement with the protruding post 113; In FIG. 20 and FIG. 21, the protruding post 113 is two tandem cylinders with elliptical cross section, the recess 214 comprises of a two tandem leading recess with elliptical cavity and the capacity recess which can be tightly complement with the protruding post 113. In FIG. 20, the male connecting piece has no protruding post, while the screw 140 complement with the male connecting piece had conical shaped screw tongue, the recess 214 comprises of a two tandem leading recess with elliptical cavity and the capacity recess which can be tightly complement with the protruding post 113.

Of course, it should be known that FIG. 18, FIG. 19, FIG. 20, FIG. 21 and FIG. 22 only show a few examples of the shapes of the protruding post 113 and the recess 214 when the male connecting piece is matched with the female connecting piece, those are not to limit the shapes of the protruding post of the male connecting piece and the recess of the female connecting piece in the present invention.

Figure 24:
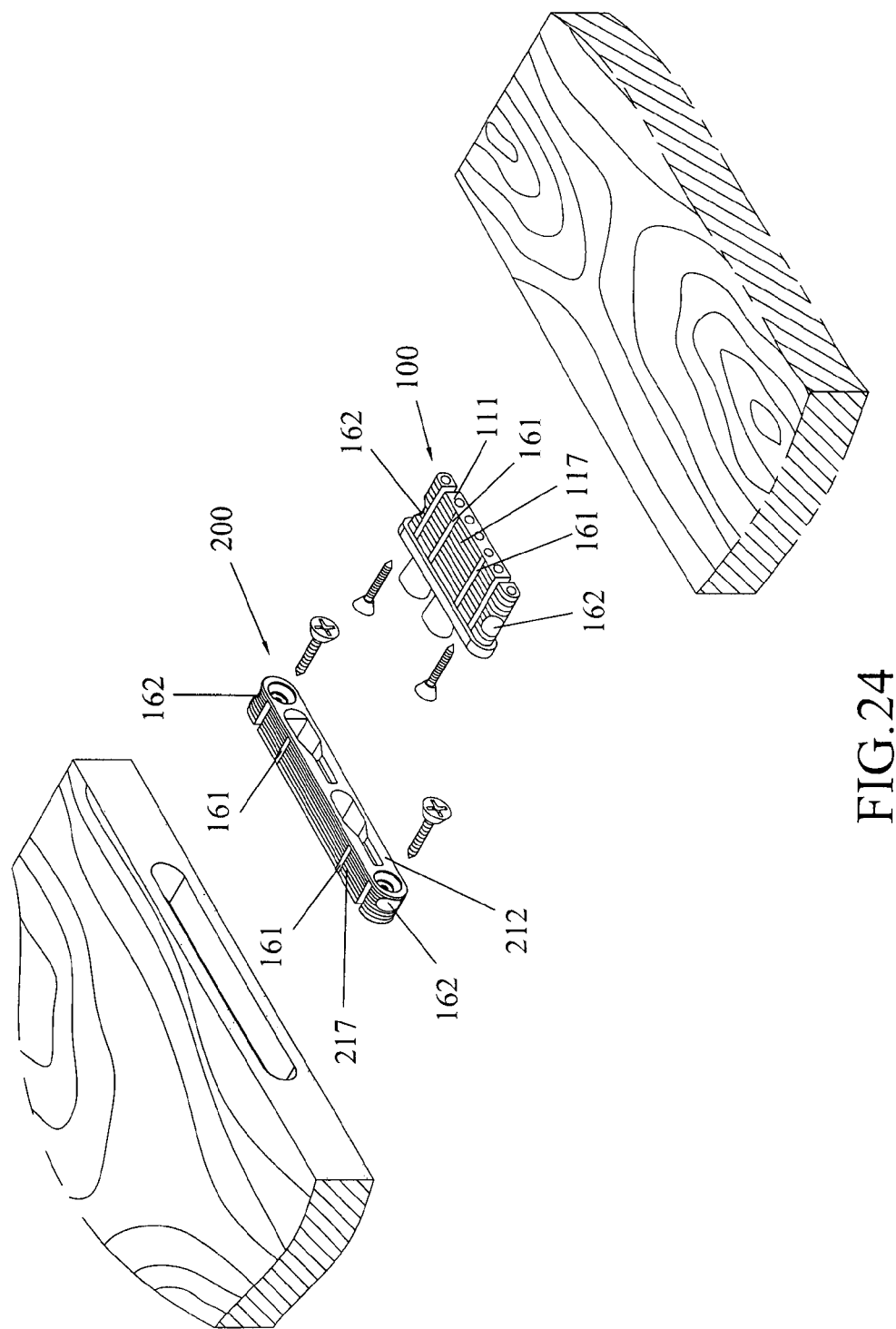
FIG. 24 is a perspective view of the furniture connecting piece in accordance with an eleventh embodiment of the invention.

Referring to FIG. 24, FIG. 24 shows the eleventh embodiment of the furniture connecting piece in the invention.

In the embodiment, both of the front surface 117 and the back surface 118(not show) of the male connecting piece 100 have several glue tanks 161 which run into the upper surface 111 and the lower surface 112 of the base. The opposite side surfaces 112 of the male connecting piece respectively have a notch 162 near the upper surface 111. Both of the front surface 217 and the back surface 218 (not show) of the female connecting piece 200 have a few glue tanks 161 which run into the upper surface 211 and the lower surface 112 of the base. The opposite surfaces 212 of the female connecting piece respectively have a notch 162 near the upper surface 211.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A furniture connecting piece, comprising:
   a base; and
   a pair of screws,
   wherein said base has opposite upper surface and lower surface, opposite side surfaces, and opposite front surface and back surface;
   wherein the furniture connecting piece is characterized in that two opposite side ends of said lower surface of said base are respectively provided with a gapped groove extending to said upper surface of said base, each of said gapped grooves runs through said front surface and said back surface of said base, two opposite side ends of said upper surface of said base are respectively provided with a screw hole communicating with said respective gapped groove, and said screws pass through said screw holes and are partially contained within said gapped grooves respectively;
   wherein said gapped grooves are located adjacent to said opposite side surfaces of said base respectively, an inner wall of each of said gapped grooves, which is far from said respective side surface of said base is perpendicular to said lower surface of said base; another inner wall of each of said gapped grooves, which is near to said respective side surface of said base, has a lower portion inclining to a center of said respective gapped groove;
   wherein the perpendicular inner wall and the inclining inner wall of each of said gapped grooves face each other.

2. The furniture connecting piece according to claim 1, wherein intersections of inner walls of said gapped groove and said lower surface are arc-shaped.

3. The furniture connecting piece according to claim 1, wherein said front surface, said back surface, and said side surfaces of said base are all provided with chamfered teeth.

4. The furniture connecting piece according to claim 1, wherein a plurality of blind holes are defined in said lower surface of said base.

5. The furniture connecting piece according to claim 1, wherein one or several protruding posts are formed on said upper surface of said base.

6. The furniture connecting piece according to claim 1, wherein said screw has a screw cap, a screw body and a screw tongue at opposite sides of the screw cap, said screw body passes through said screw hole and is contained within said gapped groove, said screw cap holds in said screw hole, and said screw tongue is adapted for inserting into another suitable article.

7. The furniture connecting piece according to claim 1, wherein said upper surface of said base defines one or several recesses extending to said lower surface of the base.

8. The furniture connecting piece according to claim 7, wherein said recess runs through said lower surface of said base to form an opening in the lower surface, and said lower surface of said base sets a cover for sealing the opening.

9. The furniture connecting piece according to claim 1, wherein said screw hole is trumpet-shaped.

10. The furniture connecting piece according to claim 1, wherein said front surface and said back surface define one or several glue tanks which run through said upper surface and said lower surface of said base.

11. The furniture connecting piece according to claim 1, wherein said opposite side surfaces of said base respectively define a notch near said upper surface.

12. A furniture connecting piece, comprising:
    a male connecting piece; and
    a female connecting piece,
    wherein said male connecting piece includes a male base and a pair of screws, said male base has opposite upper surface and lower surface, opposite side surfaces, and opposite front surface and back surface, and said male connecting piece is provided with one or several protruding posts on said upper surface of said male base;
    wherein said female connecting piece is provided with one or several recesses engaging with said protruding posts respectively;
    wherein the furniture connecting piece is characterized in that two opposite side ends of said lower surface of said male base are respectively provided with a gapped groove extending to said upper surface of said male base, each of said gapped grooves runs through said front surface and said back surface of said male base; two opposite side ends of said upper surface of the male base are respectively provided with a screw hole communicating with said respective gapped groove, and said screws pass through said screw hole and are partially contained within said gapped grooves respectively;
    wherein said gapped grooves are located adjacent to said opposite side surfaces of said male base respectively, an inner wall of each of said gapped grooves, which is far from said respective side surface of said male base is perpendicular to said lower surface of said male base; another inner wall of each of said gapped grooves, which is near to said respective side surface of said male base, has a lower portion inclining to a center of said respective gapped groove;

wherein the perpendicular inner wall and the inclining inner wall of each of said gapped grooves face each other.

13. The furniture connecting piece according to claim 12, wherein said female connecting piece includes a female base and a screw, said female base has opposite upper surface and lower surface, opposite side surfaces, and opposite front surface and back surface; said recess is defined in said upper surface of said female base and extends to said lower surface of said female base; said lower surface of said female base is provide with a gapped groove extending to said upper surface of said female base, and the gapped groove of the female base runs through said front surface and said back surface of said female base; said upper surface of said female base is provided with a screw hole communicating with the gapped groove of the female base, and the screw of the female connecting piece passes through the screw hole of the female base and is partially contained within the gapped groove of the female base.

14. A furniture connecting piece, comprising:
a male connecting piece; and
a female connecting piece,
wherein said female connecting piece includes a female base and a pair of screws, said female base has opposite upper surface and lower surface, opposite side surfaces, and opposite front surface and back surface, and said upper surface of said female base is provided with one or several recesses extending to said lower surface of said female base;
wherein said male connecting piece is provided with one or several protruding posts engaging with said recesses respectively;
wherein the furniture connecting piece is characterized in that two opposite side ends of said lower surface of said male base are respectively provided with a gapped groove extending to said upper surface of said female base, each of said gapped grooves runs through said front surface and said back surface of said female base; two opposite side ends of said upper surface of the female base are respectively provided with a screw hole communicating with said respective gapped groove, and said screws pass through said screw hole and are partially contained within said gapped grooves respectively;

wherein said gapped grooves are located adjacent to said opposite side surfaces of said female base respectively, an inner wall of each of said gapped grooves, which is far from said respective side surface of said female base is perpendicular to said lower surface of said female base; another inner wall of each of said gapped grooves, which is near to said respective side surface of said female base, has a lower portion inclining to a center of said respective gapped groove;

wherein the perpendicular inner wall and the inclining inner wall of each of said gapped grooves face each other.

15. The furniture connecting piece according to claim 14, wherein said male connecting piece includes a male base and a screw, said male base has opposite upper surface and lower surface, opposite side surfaces, and opposite front surface and back surface; the protruding post of said male connecting piece is formed on said upper surface of said male base; said lower surface of said male base is provided with a gapped groove extending to said upper surface of said male base, and the gapped groove of the male base runs through said front surface and said back surface of said male base; said upper surface of said male base is provided with a screw hole communicating with the gapped groove of the male base, and the screw of the male connecting piece passes through the screw hole of the male base and is partially contained within the gapped groove of the male base.

16. The furniture connecting piece according to claim 14, wherein said male connecting piece includes a male base and a screw, said male base has opposite upper surface and lower surface, opposite side surfaces, and opposite front surface and back surface; said lower surface of said male base is provided with a gapped groove extending to said upper surface of said male base, and the gapped groove of the male base runs through said front surface and said back surface of the male base; said upper surface of said male base is provided with a screw hole communicating with the gapped groove of the male base; and the screw of the male connecting piece has a screw cap, a screw body and a screw tongue at opposite sides of the screw cap; said screw body passes through the screw hole of the male base and is partially contained within the gapped groove of the male base, and the screw tongue is the protruding post for engaging with the recess of the female base.

17. The furniture connecting piece according to claim 14, wherein said male connecting piece only contains a cylindrical male base and the protruding post provided on an upper surface of the cylindrical male base.

* * * * *